United States Patent [19]
Kelman et al.

[11] Patent Number: 5,354,114
[45] Date of Patent: Oct. 11, 1994

[54] INTEGRATED CROSS CAR STRUCTURAL DUCT CLUSTER

[75] Inventors: Josh Kelman, Dover; John Gray, Union, both of N.H.

[73] Assignee: Davidson Textron Inc., Dover, N.H.

[21] Appl. No.: 78,348

[22] Filed: Jun. 21, 1993

[51] Int. Cl.$^5$ .................................... B60R 27/00
[52] U.S. Cl. .................................... 296/192; 296/208; 454/127
[58] Field of Search ............... 296/192, 208, 72; 180/90; 454/124, 127

[56] References Cited

U.S. PATENT DOCUMENTS

| | | | |
|---|---|---|---|
| 2,092,542 | 9/1937 | Widman | 296/192 |
| 3,788,681 | 1/1974 | Barenyi et al. | 296/192 |
| 4,078,840 | 3/1978 | Itoh | 296/192 |
| 4,111,480 | 9/1980 | Breitschwerdt et al. | 296/208 |
| 4,391,465 | 7/1983 | Piano | 296/208 |
| 4,646,879 | 3/1987 | Mahler et al. | 296/208 X |
| 4,759,568 | 6/1988 | Paefgen et al. | 280/732 |
| 4,874,198 | 10/1989 | Roller | 296/208 X |
| 4,962,961 | 10/1990 | Ito et al. | 296/192 |
| 5,005,898 | 4/1991 | Benedetto | 296/194 |
| 5,082,078 | 1/1992 | Umeda et al. | 296/192 X |
| 5,088,571 | 2/1992 | Burry | 180/90 |
| 5,127,703 | 7/1992 | Takahashi | 296/208 X |

*Primary Examiner*—Joseph Pape
*Attorney, Agent, or Firm*—Reising, Ethington, Barnard, Perry & Milton

[57] ABSTRACT

An automotive vehicle body has an integrated cross car structural duct cluster that is a composite that is connected to side pillars located on opposite sides of the vehicle body. The composite acts as a cross beam and provides four ducts that extend across the width of the vehicle body. Three ducts are related to the HVAC system of the vehicle and the fourth is a wiring duct. Five variations are disclosed. In two the composite comprises steel rods embedded in a molded plastic body. In the other three the composite comprises a steel plate that is attached to a molded plastic body.

24 Claims, 2 Drawing Sheets

INTEGRATED CROSS CAR STRUCTURAL DUCT CLUSTER

BACKGROUND OF THE INVENTION

This invention relates to fabrications for automotive vehicles and more particularly to structural fabrications for automotive vehicle bodies.

Automotive vehicle bodies customarily include a frame or underbody that has a pair of vertical stantions or A-pillars on the opposite sides of the vehicle body at the juncture of an engine compartment and a passenger compartment. These stantions or A-pillars are usually connected to each other by a cross beam in the form of a steel tube or stamping at the cowl of the vehicle body which is located near an instrument panel. The cross beam provides cross car stiffness, manages side impact loads, provides steering column support and absorbs the reaction force of the passenger supplemental inflatable restraint (PSIR) when it is deployed. See, for example U.S. Pat. No. 4,391,465 granted to Renzo Piano Jul. 5, 1983 which discloses a body structure that has side stantions that are connected to each other by two cross beams, one of which is at the cowl of the vehicle behind an instrument panel.

Automobiles also typically include ducts associated with or near the instrument panel for delivering treated or ambient air in connection with the heating, ventilating and air conditioning (HVAC) system of the automobile. For example, the U.S. Pat. No. 4,391,465 granted to Renzo Piano Jul. 5, 1983 discussed above also discloses an assembly for separating the passenger and engine compartments that includes two thermoplastic elements. One thermoplastic element has an upper portion that supports the second element and generates with the second element cavities and channels for conveying air in connection with the heating and ventilating system. The one element is made of a plastic material of high mechanical and flame resistance while the second element is made of a plastic material that has a hardness and mechanical resistance that are lower.

The two thermoplastic elements that generate the cavities and channels, however, are separate and distinct from the cross beam at the cowl of the vehicle that is described above. Moreover, the cavities and channels are described in broad terms and illustrated so that the precise shapes, particular functions and interactions of the various cavities and channels are not clear.

Fabrications for automotive vehicle bodies that include structural components that act as cross beams connecting the stantions or A-pillars of the vehicle body are also known.

U.S. Pat. No. 4,759,568 granted to Franz Paefgen and Hermann Guhl Jul. 26, 1988 discloses an instrument panel for a motor car that consists essentially of a light alloy beam which extends over the whole width of the vehicle compartment below the windshield and which carries an instrument top. The instrument panel, however, does not have any heating, ventilating or air conditioning ducts.

U.S. Pat. No. 5,005,898 granted to Piero Benedetto, Salvatore Bezzi and Paola Odone Apr. 9, 1991 discloses vehicle structure in which a panel divides the engine compartment and the passenger compartment. The panel comprises a rigid element with a mechanical support function and a soundproofing element constructed of expanded material of cellular structure, preferably with closed cells (such as polyurethane). The soundproofing element forms a single body with the rigid element which defines a load bearing framework embedded in the soundproofing element. The rigid element is preferably formed by molding a flame resistant synthetic plastic material but can also be of sheet metal construction. The panel comprises an upper portion formed substantially as a cross-member and provided integrally with respective brackets for connection to the vehicle body and with at least one respective bracket for supporting an instrument dashboard. The panel of this arrangement also does not have any heating, ventilating or air conditioning ducts.

U.S. Pat. No. 5,088,571 granted to Donald R. Burry and Leonard J. Pilato Feb. 18, 1992 discloses a modular structural instrument panel carrier comprising two panels that are attached together to define a box beam assembly which extends transversely across the vehicle. The panels are preferably constructed of fiber reinforced plastic. The box beam assembly is an integral load carrying member of the vehicle body and defines a single air transfer duct extending fully across the vehicle for several passenger compartment outlets. The box beam relies on shape, intra panel attachment and fiber reinforced plastic for its strength and provides just one duct for the HVAC system of the automobile.

SUMMARY OF THE INVENTION

The object of this invention is to provide a fabrication for an automotive vehicle body that combines the functions of a cross beam and a cross car duct in a way that provides a very strong cross beam.

Another object of the invention is to provide a fabrication for an automotive vehicle body in the form of a cross car structural duct cluster that combines the functions of a cross beam with the functions of several cross car ducts.

A feature of the invention is that the fabrication or cross car structural duct cluster is a composite of metal and molded thermoplastic material that is combined to enhance the strength characteristics of a cross car beam.

Another feature of the invention is that the fabrication or cross car structural duct cluster provides several cross car ducts in a compact space.

Another feature of the invention is that the fabrication or cross car structural duct cluster provides a windshield defroster duct that is strategically located at an upper corner to facilitate placement near the bottom of a windshield.

Still another feature of the invention is that the fabrication or cross car structural duct cluster provides a side window defroster duct that spans the width of the vehicle so that the ends of the duct are strategically located near the respective side windows.

Yet another feature of the invention is that the fabrication or cross car structural duct cluster provides a wiring duct that spans the width of the vehicle so that wiring can be delivered from either side of the vehicle to any location in the instrument panel between the sides of the vehicle.

Still yet another feature of the invention is that the fabrication or cross car structural duct cluster provides an HVAC duct that spans the width of the vehicle and that is strategically behind the instrument panel for delivering treated or ambient air to the passenger compartment via conduits through the instrument panel located anywhere between the sides of the vehicle.

BRIEF DESCRIPTION OF THE DRAWINGS

The above and other objects, features and advantages of the invention will become more apparent from the following description taken in conjunction with the accompanying drawings wherein like references refer to like parts and wherein.

DESCRIPTION OF THE INVENTION

Figure 1:
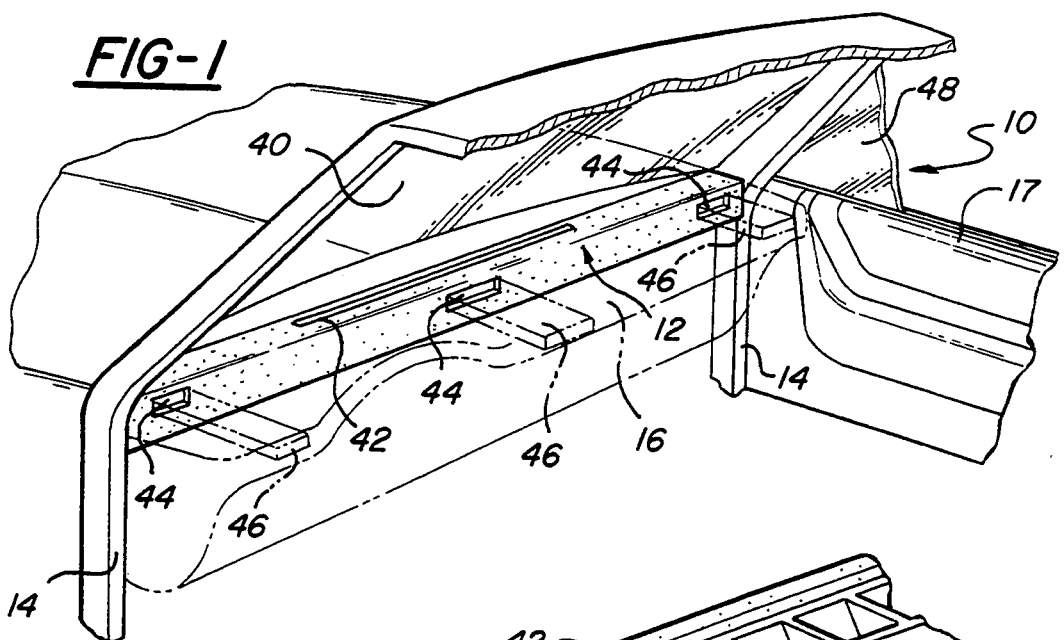
FIG. 1 is a partial perspective view of an automotive vehicle having an integrated cross car structural duct cluster in accordance with a first embodiment of the invention.

Referring now to the drawing, FIG. 1 shows an automotive vehicle body 10 that has a fabrication in accordance with a first embodiment of the invention that is in the form of an integrated cross car structural duct cluster 12. The integrated cross car structural duct cluster 12 is mounted in the motor vehicle body 10 between side stantions or A-pillars 14 and behind an instrument panel shown in phantom at 16.

The A-pillars 14 are located at a juncture of the passenger and engine compartments and typically carry hinges for supporting swinging front vehicle doors 17. The A-pillars 14 are typically connected by a cross beam at the cowl, and in this case, the integrated cross car structural duct cluster 12 acts as a cross beam that has its opposite ends connected to the respective A-pillars 14 in a suitable manner to reinforce the vehicle body 10 and increase its torsional rigidity. The integrated cross car structural duct cluster 12 also provides several ducts including several ducts that are associated with the HVAC system of the automobile.

The integrated cross car structural duct cluster 12 is a composite of steel rods 18 that span the A-pillars 14 and that are insert molded or otherwise suitably embedded in a molded body 20 of thermoplastic material such as polypropylene or polycarbonate/ABS. The molded body 20 is shaped to provide a plurality of ducts 22, 24, 26 and 28 that extend from one end of the composite to an opposite end of the composite so as to span the A-pillars 14 when the integrated cross car structural duct cluster 12 is mounted in the vehicle body 10.

The molded plastic body 20 has a cross shaped portion 30 that provides two right angled inside walls for each of the ducts 22, 24, 26 and 28. The cross shaped portion 30 has integral flanges 32 and 34 at the respective ends of its vertical part. Flange 32 provides a third outside wall for ducts 22 and 24 while flange 34 provides a third outside wall for ducts 26 and 28.

Figure 2:
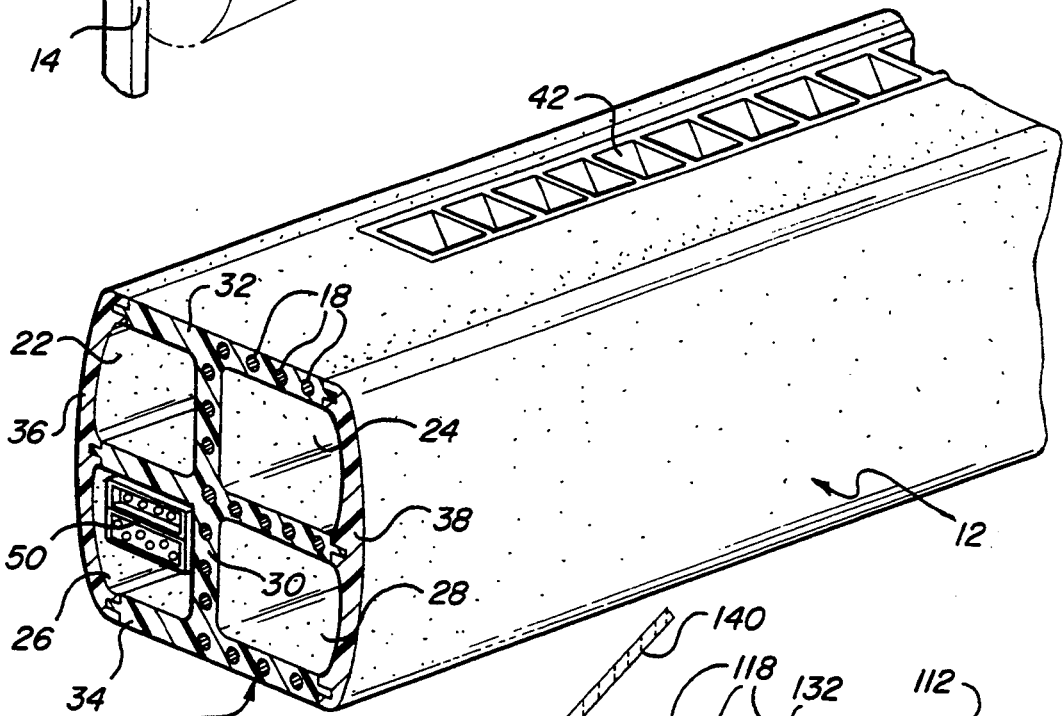
FIG. 2 is a sectioned perspective view of the integrated cross car structural duct cluster that is shown in FIG. 1.

The steel rods 18 are embedded in the flanges 32 and 34 as well as the cross shaped portion 30 as shown in FIG. 2.

The integrated cross car structural duct cluster 12 includes two duct closure panels 36 and 38 that are separately molded of a thermoplastic material such as polypropylene or polycarbonate/ABS. Closure panel 36 is attached to the horizontal part of the cross shaped portion 30 and flanges 32 and 34 at one end to provide a second outside wall that closes ducts 22 and 26. Closure panel 38 is attached to the horizontal part of the cross shaped portion 30 and the flanges 32 and 34 at the opposite end in a like manner for closing ducts 24 and 28.

Closure panels 36 and 38 may be attached by any suitable means. However the inclusion of a snap fit assembly is preferred. Patent application Ser. No. 078,140 filed Jun. 15, 1993 discloses several closure panel attachments that can be used and consequently this copending patent application is hereby incorporated in this patent application by reference.

When the closure panels 36 and 38 are attached, the integrated cross car structural duct cluster 12 has four ducts 22, 24, 26 and 28 that extend from one end of the composite to the other. Ducts 22, 24 and 28 are part of the HVAC system of the automobile for delivering treated or ambient air to strategic locations in the automobile.

Duct 22 is a defroster duct that is strategically located at the upper corner to facilitate placement adjacent the lower end of the windshield 40 as shown in FIG. 1. It delivers warm defrosting air to the windshield 40 via outlets 42 that extend through the portion of the flange 32 that forms a wall for duct 22. Defroster duct 22 spans the width of the windshield 40 so that is great latitude in placing and sizing the outlets 42 for operating efficiency.

Duct 24 is an HVAC duct that is strategically located at the opposite side to facilitate placement immediately behind the instrument panel 16 as shown in FIG. 1. It delivers treated or ambient air to the passenger compartment through outlets 44 that connect with conduits 46 that extend through the instrument panel 16. HVAC duct 24 is not only immediately behind the instrument panel 16 but also spans the width of the vehicle so that there is great latitude in placing and sizing the conduits 46 for operating efficiency.

Duct 28 below duct 24 is a side window duct that delivers warm air to the side windows 48 of the automobile through outlets at the ends of duct 26 (not shown) for defrosting the side windows. Duct 28 also spans the width of the vehicle so that its ends are strategically located near the respective side windows 48 for operating efficiency.

The integrated cross car structural duct cluster 12 also includes the fourth duct 26 that may be used as a wiring duct for a wiring harness 50. Duct 26 also extends from one end of the composite to the other so that is spans the width of the vehicle. Consequently wiring can be delivered from either side of the vehicle to any location in the instrument panel 16 between the sides of the vehicle.

Besides providing several strategically located ducts, the integrated cross car structural duct cluster 12 also provides a very strong cross beam. The steel rods 18 manage tensile and compressive loads due to side impact and for cross car stiffness. Moreover, the thermoplastic material of the molded body 20 surrounding the steel rods 18 helps the steel rods resist buckling and shear forces. Thus the integrated cross car structural duct cluster 12, because of its composite nature also manages bending forces due to steering column, PSIR and knee bolster loads.

Figure 3:
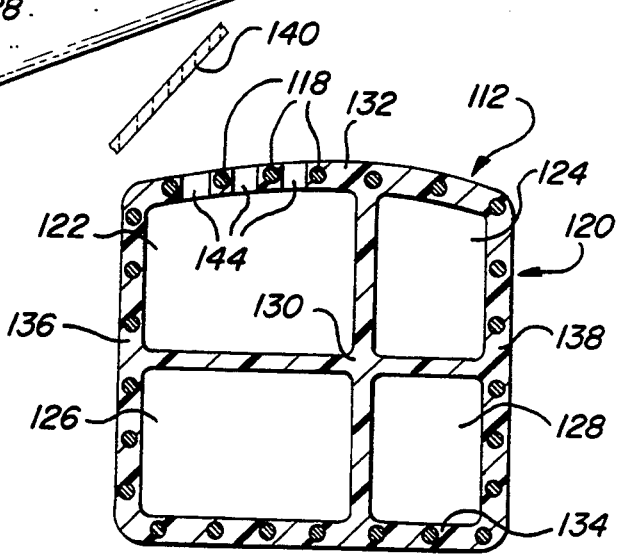
FIG. 3 is a transverse cross section of an integrated cross car structural duct cluster in accordance with a second embodiment of the invention.
Figure 4:
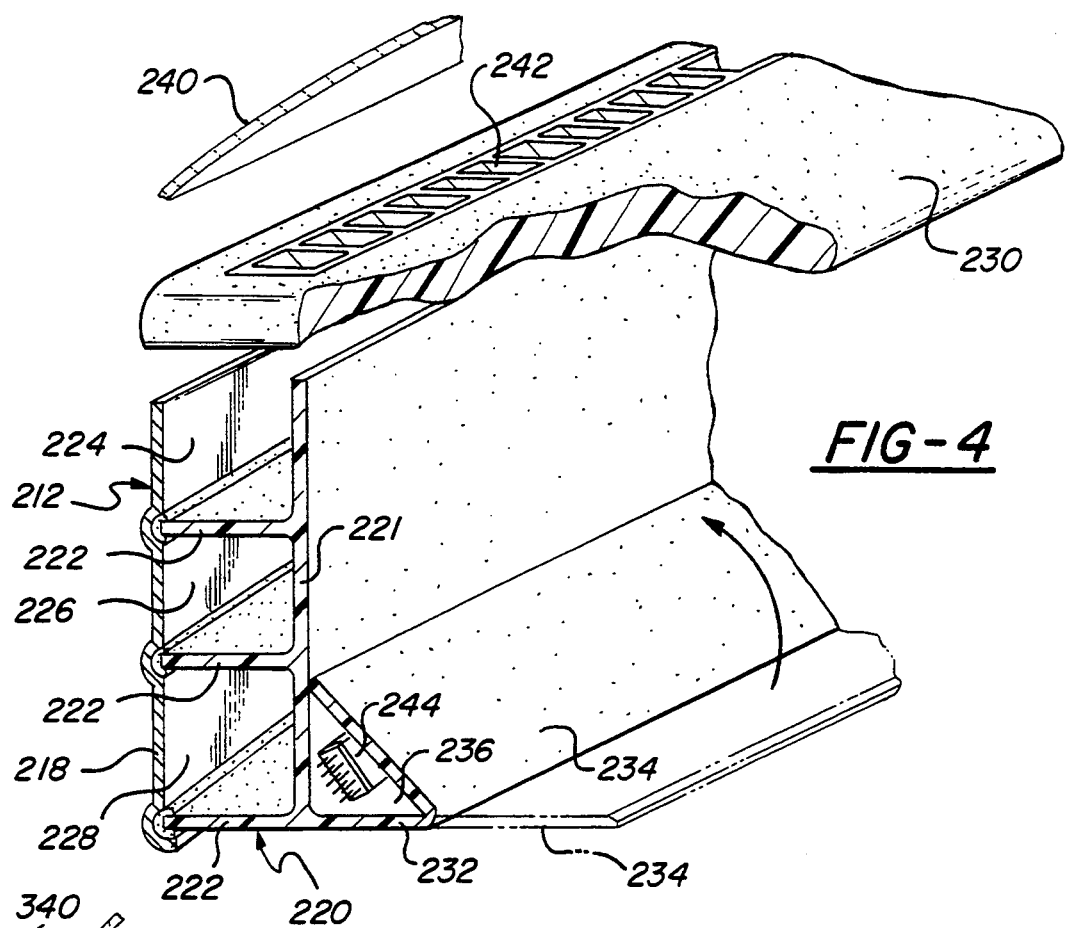
FIG. 4 is sectioned exploded perspective view of an integrated cross car structural duct cluster in accordance with a third embodiment of the invention.

Referring now to FIG. 3 an integrated cross car structural duct cluster 112 in accordance with a second embodiment of the invention is shown in transverse cross section. In this embodiment the thermoplastic body 120 and the duct closure panels 136 and 138 are molded as one piece so that the closure panels 136 and 138 are integrally attached to the opposite ends of the flanges 132 and 134 and also to the opposite ends of the horizontal part of the cross shaped portion 130. In this embodiment, the steel rods 118 are all embedded in the rectangular periphery of the molded part that comprises the flanges 132 and 134 and the integral closure panels 136 and 138. The integrated cross car structural duct cluster 112 is otherwise the same as the integrated cross car structural duct cluster 12 so that it also provides four strategically located ducts 122, 124, 126 and 128 that extend from one end to the opposite end of the composite. The duct 122 at the upper corner remains a defroster duct for delivering warm air to windshield 140 through outlets 144. However, the ducts 124, 126 and 128 have changed functions so that the duct 124 is now the side window defroster duct, the duct 126 is now the HVAC duct for the passenger compartment and the duct 128 is now the wiring duct. An advantage of this design is flexibility in processing. The entire duct cluster 112 can be molded at one time in an extrusion or a pultrusion process with the steel rods 118 being embedded in the rectangular periphery during the process. Alternatively the rectangular periphery can be molded with the steel rods 118 being embedded during the extrusion or pultrusion process. In this instance the cross shaped portion 130 is molded separately and fastened in place. Another advantage of this design is that the entire periphery is of one piece construction and has the steel rods 118 embedded along the entire rectangular periphery which enhances the capability of the duct cluster 112 for energy management and cross car stiffness FIG. 4 shows an integrated cross car structural duct cluster 212 in accordance with a third embodiment of the invention. In this embodiment, the composite comprises a metal member that is in the form of a steel plate 218 that is adapted for connection to the side or A-pillars 14 that are located on opposite sides of a vehicle body so as to act as a cross beam and provide cross car stiffness. The composite also includes a molded plastic body 220 made of any suitable thermoplastic or thermoset material.

The molded plastic body 220 has an end wall 221 that supports three cantilevered walls 222 that are attached to the steel plate 218 at their free end so that the steel plate 218 defines one outside wall of three vertically aligned ducts 224, 226 and 228 that extend from the one end to the opposite end of the composite. The end wall 221 of the molded plastic body 220 defines a second opposite wall for each of the three ducts 224, 226 and 228.

The three cantilevered walls 222 provide one side wall for the upper duct 224 and two side walls for the middle and lower ducts 226 and 228. The second side wall for duct 224 is provided by a separately molded top pad 230 that is attached to the top of the steel plate 218 and the top the end wall 221. The molded plastic body 220 has a fourth cantilevered wall 232 that is coplanar with the lowest of the three cantilevered walls 222 and that extends in the opposite direction. The cantilevered wall 232 has an end flap 234 that is folded up from the phantom line position shown in FIG. 4 and leaned against the end wall 221 as shown in solid line to form a fourth duct 236 of triangular cross section that is totally formed by the molded plastic body 220. Thus the integrated cross car structural duct cluster 212 has four ducts 224, 226, 228 and 236 that extend from end to end.

The function of the ducts in this third embodiment is as follows. The duct 224 which is strategically located at the top corner for placement adjacent the lower edge of a windshield is a defroster duct for windshield 240 that delivers warm to the windshield via outlets 242 in the top pad 230. The middle duct 226 is the HVAC duct for the passenger compartment and the lower duct 228 is the side window defroster duct. The triangular duct 236 is advantageously the wiring duct which can be enclosed around the wiring harness 244 by placing the wiring harness 244 on the cantilevered wall 232 before the flap 234 is leaned up against the end wall 221. Another advantage of this design is that both the HVAC duct 226 and the wiring duct 236 can be placed immediately behind an instrument panel so that each has total access to the instrument panel without interference from the other.

Figure 5:
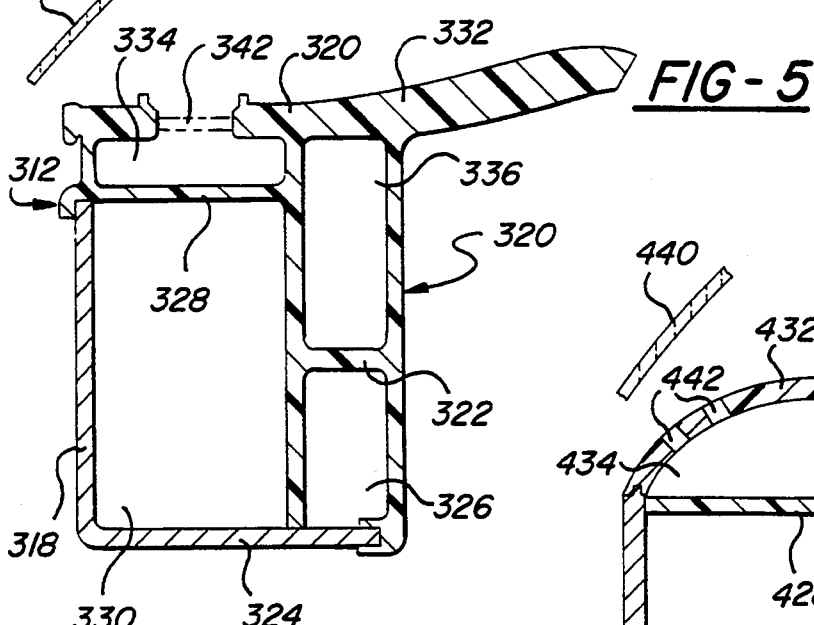
FIG. 5 is a transverse cross section of an integrated cross car structural duct cluster in accordance with a fourth embodiment of the invention.

FIG. 5 is a transverse cross section of an integrated cross car structural duct cluster 312 in accordance with a fourth embodiment of the invention. In this embodiment, the composite comprises a metal member that is in the form of a right angled steel plate 318 that is adapted for connection to the side or A-pillars 14 that are located on opposite sides of a vehicle body so as to act as a cross beam and provide cross car stiffness. The composite also includes a molded plastic body 320 made of polypropylene, polycarbonate/ABS or other materials. The molded plastic body 320 has an H-shaped portion 322 that is attached to the base 324 of the steel plate 318 so as to form a duct 326. The molded plastic body 320 includes a cantilevered wall 328 that provides an asymmetrical cross shaped portion with the inner part of the H-shaped portion 322. The cantilevered wall 328 is attached to the top of the vertical wall of the L-shaped steel plate 318 so that a second duct 330 is enclosed by the molded plastic body 320 and the steel plate 318. The molded plastic body 320 also includes an integrally attached top pad 332 that is attached to the top of the two vertical parts of H-shaped portion 322 and to the cantilevered wall 328 so as to provide two ducts 334 and 336 that are completely formed by the molded plastic body 320. Thus the integrated cross car structural duct cluster 312 also has four ducts 326, 330, 334 and 336 that extend from end to end. The function of the ducts in this fourth embodiment is as follows. The duct 334 which is strategically located at an upper corner is a defroster duct for windshield 340 that delivers warm air to the windshield 340 via outlets 342 in the integral top pad 332. The duct 330 below the windshield defroster duct 334 is the HVAC duct for the passenger compartment and the duct 336 next to it is the side window defroster duct. The duct 326 is the wiring duct. An advantage of this design and the design discussed below is that a solid metal cross car beam is integrated into the duct work in the form of a right angled plate that increases the strength of the integrated cross car structural duct cluster.

Figure 6:
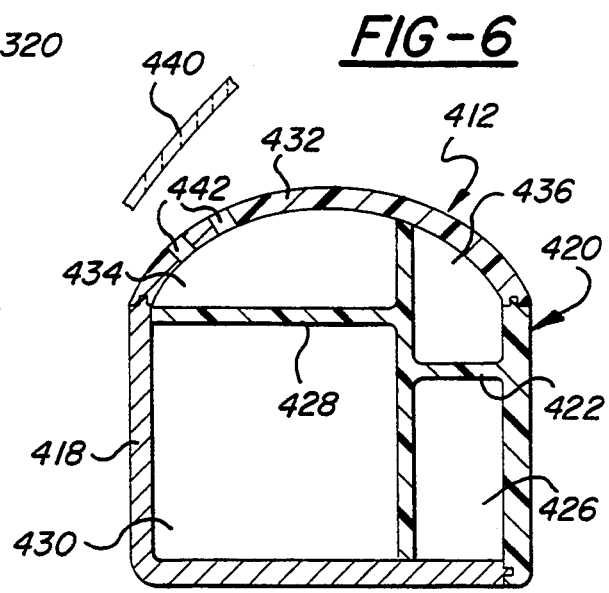
FIG. 6 is a transverse cross section of an integrated cross car structural ducts in accordance with a fifth embodiment of the invention.

FIG. 6 is a transverse cross section of an integrated cross car structural duct cluster 412 in accordance with a fifth embodiment of the invention. In this embodiment, the composite also comprises a metal member that is in the form of a right angled steel plate 418 and a two piece molded plastic body 420 of polypropylene or polycarbonate/ABS that is shaped similar to the molded plastic body 320. Thus the molded plastic body 420 also has an H-shaped portion 422 that is attached to the base 424 of the steel plate 418 so as to form a duct 426. The molded plastic body 420 likewise includes a cantilevered wall 428 that completes an asymmetrical cross shaped portion and that is attached to the top of the vertical wall of the L-shaped steel plate 418 so that a second duct 430 is enclosed by the molded plastic body 420 and the steel plate 418. However, the top pad is replaced by a curved duct closure panel 432 that is molded as a separate second piece that is attached to the top of the H-shaped portion 422 and to the cantilevered wall 428 so as to provide two ducts 434 and 436 that are completely formed by the two piece molded plastic body 420. The duct closure panel 432 may be attached in any suitable manner including those described above in connection with the closure panels 36 and 38.

The integrated cross car structural duct cluster 412 also has four ducts 426, 430, 434 and 436 that extend from end to end. The function of the ducts in this fifth embodiment is the same as in the fourth embodiment. The duct 434 which is strategically located at the upper corner is a defroster duct that delivers warm air to a windshield 440 via outlets 442 in the top panel 432. The duct 430 below the windshield defroster duct 434 is the HVAC duct for the passenger compartment and the duct 436 next to it is the side window defroster duct. The duct 426 is the wiring duct. An advantage of this design is that the defroster duct closure 434 does not depend on an instrument panel topper pad for closure so as to avoid the possibility or complicated assembly or molding procedures.

The invention has been described in an illustrative manner, and it is to be understood that the terminology which has been used is intended to be in the nature of words of description rather than of limitation.

Obviously, many modifications and variations of the present invention in light of the above teachings may be made. It is, therefore, to be understood that, within the scope of the appended claims, the invention may be practiced otherwise than as specifically described.

The embodiments of the invention in which an exclusive property or privilege is claimed are defined as follows:

1. An integrated cross car structural duct cluster comprising;
   a composite that is adapted for connection to side pillars located on opposite sides of a vehicle body so as to act as a cross beam, the composite including at least one metal member that extends from one end of the composite to an opposite end of the composite to provide cross car stiffness and at least one molded plastic body that extends from the one end to the opposite end for defining at least one wall that extends from the one end to the opposite end of the composite for a duct that extends from the one end to the opposite end of the composite.

2. An integrated cross car structural duct cluster comprising;
   a composite that is adapted for connection to side pillars located on opposite sides of a vehicle body so as to act as a cross beam, the composite including at least one metal member that extends from one end of the composite to an opposite end of the composite to provide cross car stiffness and at least one molded plastic body that is attached to the metal member and that extends from the one end to the opposite end for defining at least one wall of a plurality of ducts that extend from the one end to the opposite end of the composite.

3. The integrated cross car structural cluster as defined in claim 2 wherein the composite has a generally rectangular profile and one of the plurality of ducts is located at an upper corner and has outlets whereby the one duct is strategically located and adapted for use as a defroster duct.

4. The integrated cross car structural cluster as defined in claim 3 wherein the plurality of ducts include a second duct that extends from one end of the composite to an opposite end and that has outlets at its ends whereby the second duct is strategically located and adapted for use as a side window defroster duct.

5. The integrated cross car structural cluster as defined in claim 4 wherein the plurality of ducts include a third duct that extends from one end of the composite to an opposite end and that has outlets along its length whereby the third duct is strategically located and adapted for use as an HVAC duct for delivering treated or ambient air to a passenger compartment.

6. The integrated cross car structural cluster as defined in claim 5 wherein the plurality of ducts include a wiring duct that extends from one end of the composite to the opposite end.

7. An integrated cross car structural duct cluster comprising;
   a composite that is adapted for connection to side pillars located on opposite sides of a vehicle body so as to act as a cross beam, the composite including at least one molded plastic body that extends from one end to an opposite end of the composite for defining at least one wall of a plurality of ducts that extend from the one end to the opposite end of the composite and a plurality of metal members that are embedded in the molded plastic body and that extend from one end of the composite to the opposite end of the composite to provide cross car stiffness.

8. The integrated cross car structural duct cluster as defined in claim 7 wherein the molded plastic body has a cross shaped portion that defines at least one wall of each of four ducts.

9. The integrated cross car structural duct cluster as defined in claim 8 wherein the metal members are embedded in the cross shaped portion.

10. The integrated cross car structural duct cluster as defined in claim 9 wherein the cross shaped portion has flanges that define another wall of each of the four ducts.

11. The integrated cross car structural duct cluster as defined in claim 9 wherein the cross shaped portion defines at least two walls of each of the four ducts and has flanges that define a third wall of each of the four ducts.

12. The integrated cross car structural duct cluster as defined in claim 11 further including duct closure panels that are attached to the flanges for closing the four ducts that are defined by the cross portion and the flanges.

13. The integrated cross car structural duct cluster as defined in claim 11 wherein the plastic member has integral end panels that are integrally attached to the flanges for closing the four ducts that are defined by the cross portion and the flanges.

14. An integrated cross car structural duct cluster comprising;

a composite that is adapted for connection to side pillars located on opposite sides of a vehicle body so as to act as a cross beam, the composite including at least one metal member that extends from one end of the composite to an opposite end of the composite to provide cross car stiffness and to define at least one wall of a plurality of ducts that extend from the one end to the other end and at least one molded plastic body that is attached to the metal member and that extends from the one end to the opposite end for defining another wall of each of the ducts.

15. The integrated cross car structural duct cluster as defined in claim 14 having four ducts that extend from end to end and wherein the molded plastic body defines at least two walls of each duct.

16. The integrated cross car structural duct cluster as defined in claim 15 wherein the molded plastic body defines all the walls of at least one duct.

17. The integrated cross car structural duct cluster as defined in claim 16 wherein the molded plastic body has a foldable flap that is positioned so that the molded plastic body defines all the walls of one duct.

18. The integrated cross car structural duct cluster as defined in claim 16 wherein the molded plastic body defines all the walls of two ducts.

19. The integrated cross car structural duct cluster as defined in claim 15 wherein the molded plastic body has a cross shaped portion.

20. The integrated cross car structural duct cluster as defined in claim 19 wherein a duct closure panel is attached to the molded plastic body for closing ducts that are partially defined by the cross shaped portion.

21. An integrated cross car structural duct cluster comprising;

a composite that is adapted for connection to side pillars located on opposite sides of a vehicle body so as to act as a cross beam, the composite including a metal member that extends from one end of the composite to an opposite end of the composite to provide cross car stiffness and a molded plastic body that has an end wall that supports a plurality of cantilevered walls that are attached to the metal member at their free end so that the metal plate defines one wall of a plurality of air ducts that extend from the one end to the opposite end of the composite, the end wall of the molded plastic body defining an opposite wall for each of the air ducts and each of the cantilevered walls providing a side wall for at least one of the air ducts.

22. The integrated cross car structural duct cluster as defined in claim 21 further including a top pad that is attached to a top of the metal member and a top of the end wall to provide a side wall for one of the air ducts, the top pad having outlets along its length.

23. The integrated cross car structural duct cluster as defined in claim 21 wherein the molded plastic body has a cantilevered wall that extends in an opposite direction of the cantilevered walls attached to the metal member and that has an end flap that is folded and leaned against the end wall to form a wiring duct of triangular cross section.

24. The integrated cross car structural duct cluster as defined in claim 22 wherein the molded plastic body has a cantilevered wall that extends in an opposite direction of the cantilevered walls attached to the metal member and that has an end flap that is folded and leaned against the end wall to form a wiring duct of triangular cross section.

* * * * *